(12) United States Patent
Kato

(10) Patent No.: US 6,941,696 B2
(45) Date of Patent: Sep. 13, 2005

(54) FISHING LURE

(75) Inventor: Seiji Kato, Otsu (JP)

(73) Assignee: Jackall, Inc., Otsu (JP)

( * ) Notice: Subject to any disclaimer, the term of this patent is extended or adjusted under 35 U.S.C. 154(b) by 0 days.

(21) Appl. No.: 10/616,578

(22) Filed: Jul. 9, 2003

(65) Prior Publication Data

US 2004/0025406 A1 Feb. 12, 2004

(30) Foreign Application Priority Data

Jul. 11, 2002 (JP) ........................................ 2002-004269

(51) Int. Cl.$^7$ ............................................ A01K 85/16
(52) U.S. Cl. ...................................... 43/42.24; 43/42.35
(58) Field of Search ............................. 43/42.02, 42.15, 43/42.24, 42.28, 42.31, 42.35, 42.36, 42.32

(56) References Cited

U.S. PATENT DOCUMENTS

| | | | | |
|---|---|---|---|---|
| 941,911 A | * | 11/1909 | Burthe | 43/42.02 |
| 1,393,617 A | * | 10/1921 | Frame | 43/26.2 |
| 2,636,304 A | * | 4/1953 | Swenson | 43/42.24 |
| 2,873,549 A | * | 2/1959 | Bartlett | 43/42.22 |
| 3,344,550 A | * | 10/1967 | Peters | 43/42.11 |
| 3,938,275 A | * | 2/1976 | Fukushima | 43/42.24 |
| 3,965,606 A | * | 6/1976 | Bingler | 43/42.16 |
| 4,211,027 A | * | 7/1980 | Viscardi | 43/42.24 |
| 4,625,446 A | * | 12/1986 | Morimoto | 43/17 |
| 4,676,020 A | * | 6/1987 | Taylor et al. | 43/42.02 |
| 4,831,770 A | * | 5/1989 | Dworski | 43/42.24 |
| 5,094,026 A | * | 3/1992 | Correll et al. | 43/42.28 |
| 5,172,510 A | * | 12/1992 | Lovell, Jr. | 43/42.36 |
| 5,182,875 A | * | 2/1993 | Righetti | 43/42.24 |
| 5,193,299 A | * | 3/1993 | Correll et al. | 43/42.47 |
| 5,203,103 A | * | 4/1993 | Hawley | 43/17.1 |
| 5,299,378 A | * | 4/1994 | Ballard | 43/42.06 |
| 5,894,693 A | * | 4/1999 | Davie | 43/42.24 |
| 6,393,757 B2 | * | 5/2002 | Bomann | 43/42.09 |
| 6,453,599 B2 | * | 9/2002 | Mathews et al. | 43/42.31 |
| 6,546,663 B1 | * | 4/2003 | Signitzer et al. | 43/4.5 |
| 6,557,293 B2 | * | 5/2003 | Klapka | 43/42.06 |

FOREIGN PATENT DOCUMENTS

| | | | |
|---|---|---|---|
| JP | 10-262501 | * | 10/1998 |
| JP | 2002-136247 | * | 5/2002 |

* cited by examiner

*Primary Examiner*—Peter M. Poon
*Assistant Examiner*—David Parsley
(74) *Attorney, Agent, or Firm*—Century IP Law Group; F. Jason Far-hadian

(57) ABSTRACT

Lure body (2) comprises of hard portion (8) and soft portion (9), which is made of soft plastic, soft silicon or soft rubber. A portion of the lure body can bend repeatedly, and the hard portion is covered by the soft portion. The hard portion is made of at least two separate components, connected to each other by elastic component (10), which has elasticity. The lure body can bend approximately 30 degrees or more around the elastic component.

10 Claims, 1 Drawing Sheet

FISHING LURE

CROSS-REFERENCE TO RELATED APPLICATIONS

Pursuant to 35 U.S.C. §119(a), this application claims the benefit of earlier filing date and right of priority to the Japanese Application No. JP2002-004269, filed on Jul. 11, 2002, the content of which is hereby incorporated by reference herein in its entirety.

BACKGROUND OF THE INVENTION

1. Field of the Invention

The present invention relates to a fishing lure used for fishing and, more particularly, a fishing lure which retains its outward appearance and which can move while bending like a fish during use.

2. Description of the Related Art

A common artificial lure is made of plastic shaped like a small fish, shrimp, bug or insect, and used as bait for catching fish. The lure is attached to a fishing line instead of live bait. Plastic lures typically comprise of one piece are hard and so retained a finite shape, and the plastic body does not bend or twist like a live bait when in use. There are lures which appear to bend because the lure body comprises of a number of hard and soft components and pieces connected together. However, since the bodies of these lures do not comprise of one piece, some of them do not give the outward appearance of a fish or small animal.

Furthermore, plastic lures that are constructed of the above-mentioned hard and soft joint components are, typically, problematic because the head portion of the small fishing lure comprises of a hard component, with the fishing hook being able to be attached to this hard component. As a result, this type of plastic lure is not suitable for catching fish that bite the backside of the lure body, comprising a soft component.

SUMMARY

In accordance with one or more embodiments of the invention, a lure comprises a portion that is soft, and made of soft plastic, soft silicon or soft rubber. The lure body can repeatedly bend. The lure body comprises of a hard portion and a soft portion, and the hard portion is covered by the soft portion. The hard portion is made of separate hard components connected to one another by at least one elastic component which has elasticity, such that the lure body can bend approximately 30 degrees or more around the elastic component.

In some embodiments the hard components are located on the end portions of the body in laterally opposite directions, for example. Hooks are attached to the hard components. The elastic component can comprise of a wire, or other elastic material with similar properties. The elastic component, in one embodiment comprises a linear portion and a board-shaped portion made from a metallic alloy, for example.

In one embodiment, a fishing lure comprises a lure body comprising a hard portion and a soft portion, wherein the soft portion houses the hard portion, and wherein the hard portion comprises at least two separate components joined by an elastic component for allowing the lure body to flex. A fishing line attachment component may be attached to one of said at least two separate components for allowing a fishing line to be connected to the lure body. A hook attachment component may be attached to one of said at least two separate components for allowing a hook to be connected to the lure body.

In some embodiments, the lure body is an elongated body with one of each of the at least two separate components positioned at the elongated body's opposite ends. The at least two separate components have a composition strength that can withstand forces associated with fishing without breaking. The elastic component may be a wire or a blade-shaped mechanism having a composition strength that can withstand forces associated with fishing and repetitive bending without breaking. The elastic component has a biasing property for allowing the lure body to bend approximately 30 degrees or at least approximately 30 degrees.

In certain embodiments, a fishing lure in accordance with the invention comprises an elongated lure body comprising at least first and second hard components positioned at opposite ends of the elongated lure body and a soft cover for housing the at least first and second hard portions, the at least first and second hard portions joined by an elastic component, such that the lure body can bend around the elastic component. The elastic component has an elastic property for allowing the lure body to bend at least 30 degrees to imitate body positions of a live bate when moving.

A fishing line attachment component attaches to one of said at least first and second hard components for allowing a fishing line to be connected to the lure body. A hook attachment component attaches to one of said at least first and second hard components for allowing a hook to be connected to the lure body. The at least first and second hard components and the elastic component have a composition strength that can withstand forces associated with fishing and repetitive bending without breaking.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1A:
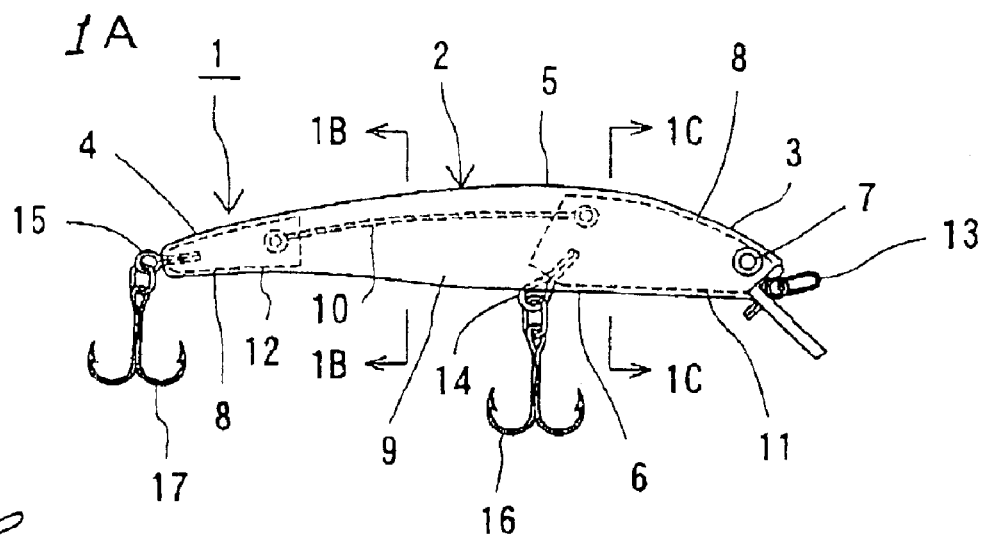
FIG. 1A is a side view of the invention showing the exterior form of the lure used as fishing bait, in accordance with one or more embodiments.
Figure 1B:
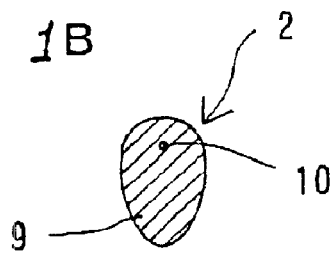
FIG. 1B is a cross-sectional view of the invention along the portion 1B–1B, in accordance with one or more embodiments.
Figure 1C:
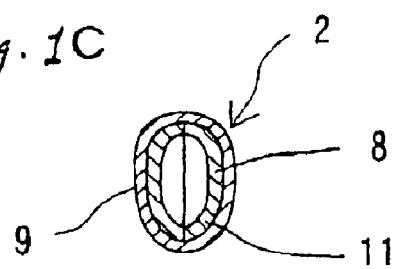
FIG. 1C is a cross-sectional view of the invention along the portion 1C–1C, in accordance with one or more embodiments.
Figure 1D:
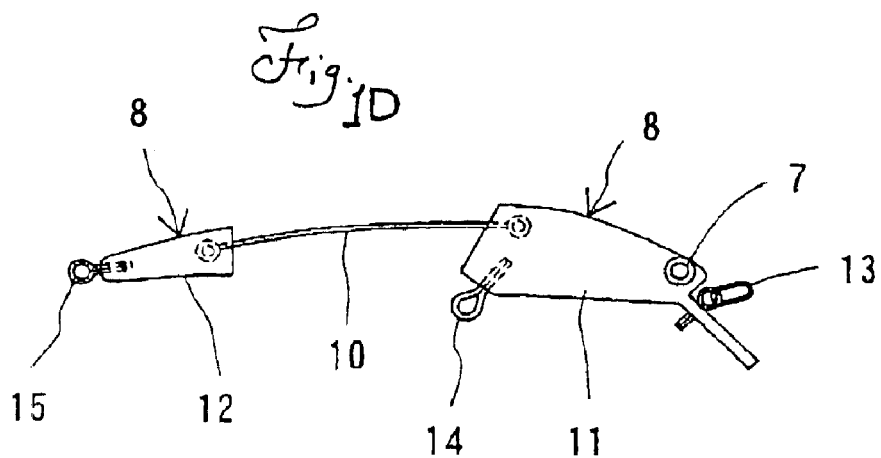
FIG. 1D is a side view of another embodiments of the invention, showing an exemplary interior construction of the invention.

Referring to FIGS. 1A–1D, in accordance with one or more embodiments of the invention, a fishing lure 1 comprises a lure body 2, a head portion 3, a tail 4, a back 5, a belly 6, one or more eyeballs 7, one or more hard portions 8, one more soft portions 9, and at least one elastic component 10 connecting together the hard portions 8.

First and second hard components 11 and 12 are covered by the soft portions 9. Of course, it should be noted that other embodiments of the invention may comprise a plurality of hard portions 8 covered by a single soft portion 9, for example. This design gives a monolithic outward appearance of a live bate even though the bate is constructed of more than one hard component.

Fishing line attachment ring components 13 are preferably attached to the fishing lure 1 to allow a fishing line to be attached to the fishing lure 1. Further, hook attachment ring components 14 and 15 are attached to the lure body 2, and preferably to the hard portions 8, to support the attachment of first and second hooks 16 and 17, respectively.

The soft portions 9 may comprise of soft plastic, soft silicon or soft rubber so that the lure body 2 can repeatedly bend during use in water current, for example. In certain embodiments, the hard portions 8 comprise at least two separate hard components 11, 12 connected to one another by an elastic component 10 which has elasticity, and the above-mentioned lure body can bend approximately 30 degrees or more around the elastic component 10.

In accordance with one embodiment, first and second hard components 11, 12 are laterally located on, for example, opposite ends of the lure body 2. First and second fishing hooks 16, 17, for example, are attached to said first and second hard components 11, 12, respectively.

The elastic component 10, in one embodiment, comprises of a biasing member. The biasing member can be an elastic wire, having a linear portion or it can be a blade having a board-shaped portion. The board-shaped portion may be made of a shape memory alloy. Shape memory alloy maintains a particular shape although it is flexible enough to bend in various directions. In one embodiment, the memory alloy is in shape of a fish, for example.

In some embodiments, first hard component 11 and second hard component 12 are located on opposite ends of the length of lure body 2. For example, the head portion 3 of the lure body 2 comprises of first hard component 11, while the tail portion 4 of lure body 2 comprises of the second hard component 12. In some embodiments, hard portion 8 of lure body 2 may include more than the first and second hard components 11, 12.

In addition to being connected by the elastic component 10, the first hard component 11 and second hard component 12 are surrounded by soft portion 9, as if the lure body 2 is made of flesh and bone. As such, the lure body 2 can bend freely and repeatedly around the elastic component 10. The elastic component 10 may be a linear wire, a piano string, a thin flexible blade, or other biasing member. The elastic component may be made for example of a memory alloy or other component that has a high degree of mechanical strength for being able to withstand repeated bending and twisting in the course of use.

In certain embodiments, hard components 11 and 12 are made of hard plastic, wood, metal alloy, or other durable material, for example. The hard components 11, 12 are strong enough to maintain a high degree of mechanical strength so that they can withstand the pull and force exerted upon them from respective fishing line and hook attachment components, during use.

The lure, according to the present invention, is of a simple structure, comprises a small number of components and is easy to manufacture. Since the lure can be mass-produced, it can be cost effective and economically profitable. Because the plastic lure includes a hard portion made of at least two separated components held together by an elastic component, the lure body seems as if it is made of flesh and bone, and it can bend freely and repeatedly around the elastic component. Also because, it is possible to attach each of the hooks to the hard portions, more fish can be caught using the lure of the present invention.

As such, the fishing lure of the present invention solves the problems and flaws of the related art lures by being constructed and designed in such a way that a component made of hard plastic is covered with soft plastic so that the lure body retains a fish-like appearance, while the lure body can bend as if it is alive. Furthermore, using a plurality of hard components, a number of fishing hooks can be attached to the body of the plastic lure maximizing the chances of catching fish that try to bite the lure, from any end.

The embodiments described above are to be considered in all aspects as illustrative and not restrictive in any manner. Thus, other exemplary embodiments, architectures, and implementations that can support various aspects of the invention may be utilized without departing from the essential characteristics described herein. For example, certain embodiments of the invention may use components made all of plastic, other embodiments may use components made of plastic, silicon, or metal compositions. These and various other adaptations and combinations of features of the embodiments disclosed are within the scope of the invention. The invention is defined by the claims and their full scope of equivalents.

What is claimed is:

1. A fishing lure comprising:
    an elongated shape memory component having a length and first and second terminal ends, the first and second terminal ends respectively coupled to first and second connectors having a circumference larger than the circumference of the shape memory component;
    a first rigid component made of hardened material, wherein the first connector nonremovably couples the first rigid component to the first terminal end so that a first portion of the length of the elongated shape memory component is inserted into the first rigid component from the first terminal end;
    a second rigid component made of hardened material, wherein the second connector nonremovably couples the second rigid component to the second terminal end so that a second portion of the length of the elongated shape memory component is inserted into the second rigid component from the second terminal end, and
    wherein a third portion of the length of the shape memory component remains exposed outside the first and second rigid components, said third portion being longer than at least one of the first and the second portions; and
    a flexible housing formed substantially proximate to and along the length of the shape memory component such that the flexible housing is tightly molded around entire length of the shape memory component with a first thickness and around the first and second rigid components with a second thickness.

2. The fishing lure of claim 1, wherein the first thickness is greater than the second thickness.

3. The fishing lure of claim 1, wherein at least a portion of the shape memory component is in form of a blade.

4. The fishing lure of claim 1, wherein at least a portion of the shape memory component is in form of a mesh.

5. The fishing lure of claim 1, wherein the flexible housing is made of a dense rubber-like material giving the lure body a shape similar to shape of a fish.

6. A fishing lure comprising:

an elongated shape memory alloy having first and second terminal ends, the first and second terminal ends respectively coupled to first and second connectors having a diameter larger than the diameter of the shape memory alloy;

a first rigid component made of hardened material fixedly connected to the first terminal end by way of the first connector, wherein the first connector prevents at least one of (1) separation of the first rigid component from the first terminal end and (2) further insertion of the first terminal end into the first rigid component;

a second rigid component made of hardened material fixedly connected to the second terminal end by way of a second connector, wherein the second connector prevents at least one of (1) separation of the second rigid component from the second terminal end and (2) further insertion of the second terminal end into the second rigid component, wherein a substantial length of the shape memory alloy remains exposed outside the first and second rigid components so that said substantial length can bend freely in any direction; wherein said exposed length is at least greater than length of insertion of at least one of the first terminal end and the second terminal end in the first rigid component and the second rigid component, respectively; and a flexible housing formed substantially proximate to and along the shape memory alloy and further around the first and second rigid components such that the flexible housing is tightly molded around entire length of the shape memory alloy, wherein the flexible housing is formed along the shape memory alloy with a first thickness and around the first and second rigid components with a second thickness, the first thickness being greater than the second thickness.

7. The fishing lure of claim 6, wherein the first and second rigid components are non-hollow.

8. The fishing lure of claim 6, wherein the flexible housing comprises rubber.

9. The fishing lure of claim 6, wherein the flexible housing is closely formed along the shape memory alloy to provide an increased center of gravity for the fishing lure.

10. The fishing lure of claim 6 further comprising a hook mechanism connected to at least one of the first and second rigid components.

* * * * *